US006867807B2

(12) United States Patent
Malloy Desormeaux

(10) Patent No.: US 6,867,807 B2
(45) Date of Patent: Mar. 15, 2005

(54) CAMERA HAVING SINGLE-BUTTON TIMED DISPLAY OF MOST-RECENTLY VIEWED IMAGE AND DEFAULT DISPLAY OF LAST VERIFICATION IMAGE AND METHOD

(75) Inventor: Stephen G. Malloy Desormeaux, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 717 days.

(21) Appl. No.: 09/945,989

(22) Filed: Sep. 4, 2001

(65) Prior Publication Data

US 2003/0043288 A1 Mar. 6, 2003

(51) Int. Cl.[7] .......................... H04N 5/222; G09G 5/00

(52) U.S. Cl. ............................ 348/333.13; 348/333.01; 345/867

(58) Field of Search ....................... 348/333.01, 333.13, 348/333.03, 333.11, 372, 731, 732, 725; 345/867, 211, 212, 214

(56) References Cited

U.S. PATENT DOCUMENTS 5,164,831 A 11/1992 Kuchta et al.
5,619,257 A 4/1997 Reele et al.
5,845,166 A * 12/1998 Fellegara et al. ........... 396/429
5,926,218 A 7/1999 Smith
5,978,016 A 11/1999 Lourette et al.
6,512,548 B1 * 1/2003 Anderson .............. 348/333.05
6,590,590 B1 * 7/2003 Wen et al. .................. 345/764
2001/0012071 A1 * 8/2001 Oeda et al. ............ 348/333.01
2001/0015760 A1 * 8/2001 Fellegara et al. ...... 348/333.01

* cited by examiner

*Primary Examiner*—Andrew Christensen
*Assistant Examiner*—Lin Ye
(74) *Attorney, Agent, or Firm*—Roland R. Schindler, II

(57) ABSTRACT

In a camera and method, the electronic image initially made available for viewing, following deactivation and reactivation of a display, depends upon the duration of inactivity and the prior electronic image viewed. In the method, a series of electronic images are sequentially captured and stored in memory in a camera. An image display of the camera is then selectively activated. A default image is shown on the display responsive to the activating. The display is selectively switched to a user selected image following the showing of the default image. The display is deactivated at the end of a display deactivation time period and selectively reactivated following the deactivating. The default image is shown, responsive to the reactivating, when the deactivating is prior to the switching. The user selected image is shown, responsive to the reactivating, when the deactivating follows the switching and the reactivating is during a first time period following the deactivating. The default image is shown, responsive to the reactivating, when the deactivating follows the switching and the reactivating is during a second time period following the first time period.

23 Claims, 10 Drawing Sheets

186
78
188
190
194
156
26
192
196
T1
T2
152
10
T3

CAMERA HAVING SINGLE-BUTTON TIMED DISPLAY OF MOST-RECENTLY VIEWED IMAGE AND DEFAULT DISPLAY OF LAST VERIFICATION IMAGE AND METHOD

CROSS REFERENCE TO RELATED APPLICATIONS

Reference is made to commonly assigned, co-pending U.S. patent applications Ser. No. 10/022,491, entitled: CAMERA HAVING SELECTIVE IMAGE EXCLUSION FROM FIRST IN-FIRST OUT ELECTRONIC IMAGE OVERWRITING AND METHOD, filed 18 Dec. 2001 in the name of Stephen G. Malloy Desormeaux, which is a Continuation-In-Part application of Ser. No. 09/945,946, entitled: CAMERA HAVING SELECTIVE IMAGE EXCLUSION FROM FIRST IN-FIRST OUT ELECTRONIC IMAGE OVERWRITING AND METHOD, filed 4 Sep. 2001, in the name of Stephen G. Malloy Desormeaux, now abandoned; Ser. No. 09/945,890, entitled: HYBRID FILM-ELECTRONIC CAMERA HAVING A DYNAMIC NUMBER OF STORED ELECTRONIC IMAGES PROTECTED FROM OVERWRITING AND METHOD, filed 4 Sep. 2001, in the name of Stephen G. Malloy Desormeaux, Ser. No. 09/946,051, entitled: CAMERA THAT DOWNLOADS ELECTRONIC IMAGES HAVING METADATA IDENTIFYING IMAGES PREVIOUSLY EXCLUDED FROM FIRST IN-FIRST OUT OVERWRITING AND METHOD, filed 4 Sep. 2001, in the names of Nathan J. Romano and Stephen G. Malloy Desormeaux, and Ser. No. 09/946,098, entitled: CAMERA HAVING ELECTRONIC IMAGES CORRESPONDING TO CURRENT FILM IMAGES AUTOMATICALLY EXCLUDED FROM FIRST IN-FIRST OUT OVERWRITING AND METHOD, filed 4 Sep. 2001, in the names of Stephen G. Malloy Desormeaux and Robert Hills.

FIELD OF THE INVENTION

The invention relates to photography and photographic equipment and more particularly relates to cameras and methods having single-button timed display of the most-recently viewed image and default display of the last verification image.

BACKGROUND OF THE INVENTION

Hybrid electronic-film cameras allow photographers to capture scene images (the light images of particular scenes) as latent images on photographic film and as electronic images that are digitized and stored in memory. Most hybrid cameras allow the capture of electronic images concurrent with the capture of the same scene in a latent image. Some hybrid cameras also allow the capture of electronic images without corresponding latent images.

In many hybrid cameras the electronic images stored in memory can be reviewed at any time when images are not actively being captured. The electronic images are shown on a display screen mounted to the camera. User controls allow the user to change from one image to another. U.S. Pat. No. 5,845,166, to Fellegara et al. and U.S. Pat. No. 5,978,016 to Lourette et al. teach battery conservation in a hybrid camera. When an image is captured in those cameras, the image display on the camera remains inactive until deliberately activated by the user pressing a switch. The camera also has a timer that turns off the image display after a short period of activation. Reactivation is by pressing the switch. The camera fully powers down after a longer time than for inactivation of the image display. A default image that is shown on reactivation of the image display is the last image captured or a specific image selected by the user using a menu option. The timer can be disabled to show images in a slide show manner, by use of an external power supply.

Timed deactivation of the image display in hybrid cameras is a useful feature; but is not without shortcomings. For efficient energy conservation, the image display must be deactivated within a very few seconds after activation. Thus, the display inactivates, not only when camera use has been temporarily suspended, but also commonly during use. The inactivation and requirement for the user to take one or more steps to return to the earlier use, is disrupting to the user.

It would thus be desirable to provide improved cameras and methods in which inactivation and reactivation of an on-camera image display is less disruptive to the user.

SUMMARY OF THE INVENTION

The invention is defined by the claims. The invention, in its broader aspects, provides a camera and method, in which the electronic image initially made available for viewing, following deactivation and reactivation of a display, depends upon the duration of inactivity and the prior electronic image viewed. In the method, a series of electronic images are sequentially captured and stored in memory in a camera. An image display of the camera is then selectively activated. A default image is shown on the display responsive to the activating. The display is selectively switched to a user selected image following the showing of the default image. The display is deactivated at the end of a display deactivation time period and selectively reactivated following the deactivating. The default image is shown, responsive to the reactivating, when the deactivating is prior to the switching. The user selected image is shown, responsive to the reactivating, when the deactivating follows the switching and the reactivating is during a first time period following the deactivating. The default image is shown, responsive to the reactivating, when the deactivating follows the switching and the reactivating is during a second time period following the first time period.

It is an advantageous effect of the invention that improved cameras and methods are provided in which inactivation and reactivation of an on-camera image display, in many cases, is only slightly disruptive to the user.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

Figure 1A:
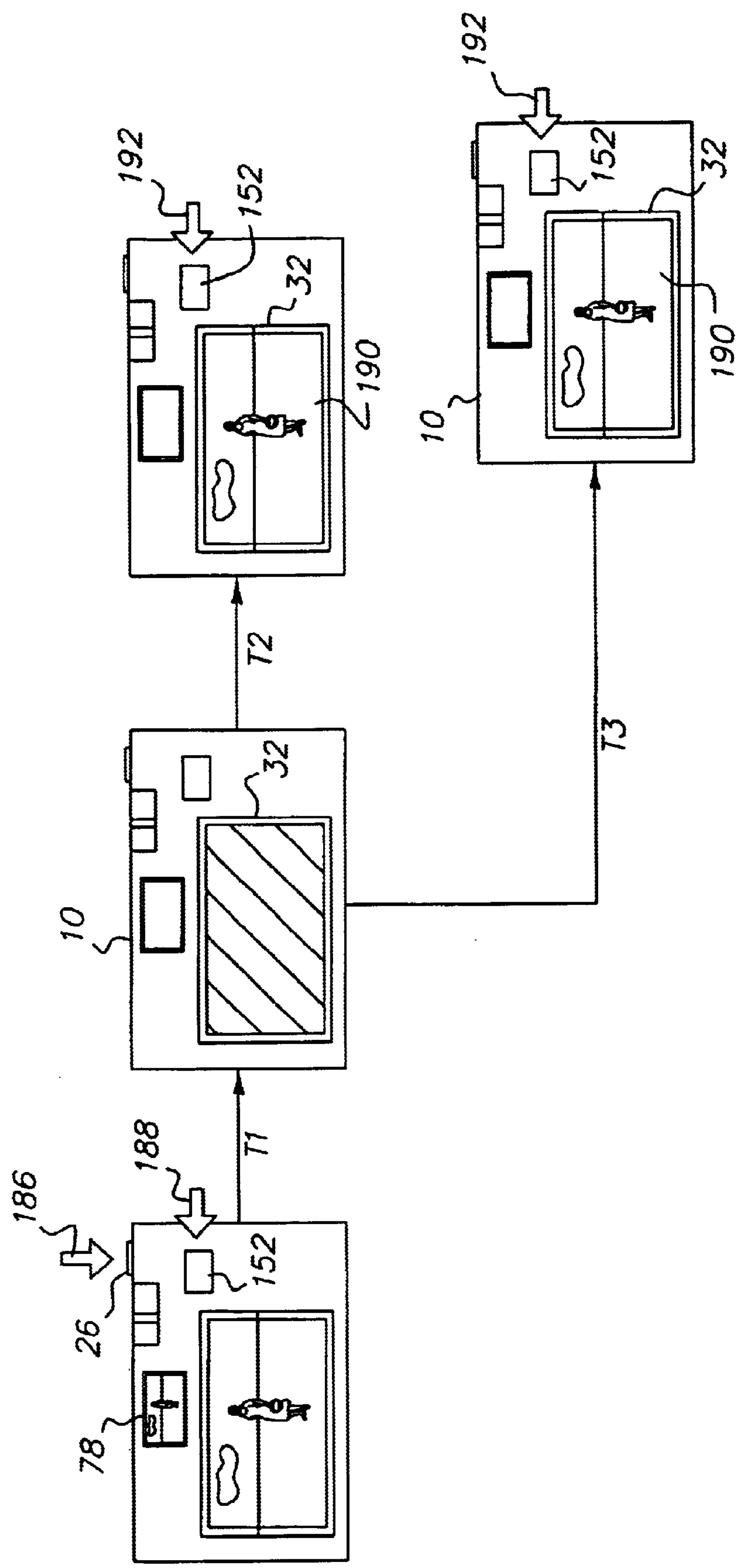
FIGS. 1*a*–1*b* are a diagrammatical view of an embodiment of the method.

In the cameras and methods, an image display on the camera is deactivated after a brief period of inactivity. The user can then reactivate the display. The image shown, at the time of reactivation, is either a default image or a user selected image other than the default image. The latter is shown, if the reactivation is within a predetermined time of the deactivation of the displaying of the user selected image. In other cases the default image is shown upon reactivation.

Referring now particularly to FIGS. 2–5, the cameras 10 herein each provide both an archival image of a scene and an evaluation image of the same scene. The archival image and the evaluation image are captured concurrently. The archival image is later used in photofinishing, or printing, or other long term or relatively long term use. The evaluation image is immediately available for display and review by the user.

Some of the cameras 10 discussed herein have embodiments with a single electronic imager that is used to capture a scene image as an initial electronic image. Both an archival image and an evaluation image are generated from the initial electronic image. The evaluation image can be subsampled from an original electronic image so as to provide lower resolution derived images. The lower resolution derived images can be provided using the method described in commonly-assigned U.S. Pat. No. 5,164,831, entitled "ELECTRONIC STILL CAMERA PROVIDING MULTI-FORMAT STORAGE OF FULL AND REDUCED RESOLUTION IMAGES", to Kuchta, et. al.

In currently preferred embodiments, the cameras 10 have a capture system 12 that has an archival image capture unit 14 and a separate evaluation image capture unit 16. The two different capture units 14,16 can take a variety of forms and can be completely separate from each other or can share some components. The evaluation image capture unit 16 captures a scene image electronically and can also be referred to as an electronic image capture unit 16. The archival image capture unit 14 captures and stores images in a film unit 18.

The term "film unit 18" is used herein to refer to media 20 on which image data is or can be stored for archival purposes, with or without media modification, and physically associated features supporting use of the media. Each film unit 18 stores or can store a plurality of archival images. In a film-type film unit 18, the media 20 is a photographic filmstrip 20*a*. The support structure 22 of a film-type film unit 18*a* generally provides light blocking and, for example, can include a spool 22*a* on which the filmstrip 20*a* is wound and canister 22*b* enclosing the filmstrip 20*a* and spool 22*a*. In an electronic-type film unit 18 the media 20 is removable digital storage media 20*b*. With digital storage media 20*b*, archival images are transferred in digital form for photofinishing, printing, or other use. A digital film unit 18, like a photographic film unit 18 is removable from the camera 10. The type of digital media used and the manner of information storage, such as optical or magnetic or electronic, is not critical. For example, a digital film unit can be a floppy disc, a CD, a DVD, a tape cassette, or flash memory card or stick.

The evaluation image capture unit 16 captures electronic images. The archival image capture unit 14 can be a photographic film image capture unit 14*a* that captures images on photographic film. Alternatively, the archival image capture unit 14 and evaluation image capture unit 16 can be two different electronic capture units. An example of a suitable digital camera having two such electronic capture units is described in U.S. Pat. No. 5,926,218, entitled "ELECTRONIC CAMERA 10 WITH DUAL RESOLUTION SENSORS", to Smith. The camera 10 can also alternatively allow use of either a film image capture unit 14*a* or an electronic capture unit as the archival image capture unit 14, at the selection of the photographer or on the basis of available storage space in one or another capture media or on some other basis. For example, a switch (not separately illustrated) can provide alternative film capture and electronic capture modes.

The invention is generally discussed herein in terms of film units 18*a* that use photographic film for storage of archival images as latent images and, optionally, store some additional information in the film unit 18, magnetically, optically, or both. It will be understood that equivalent considerations apply to other types of film units 18. For example, units of digital memory for individual archival images correspond to film frames (discussed in detail below).

Camera 10 features disclosed herein are particularly advantageous for hybrid cameras 10 having archival image units 14 that capture images using photographic film-type film units 18 as archival media 18 and also having electronic image units 16 that capture the evaluation images. This is not limiting. Advantages of specific embodiments will be readily apparent by simple experimentation implementing the particular features.

Referring now particularly to FIGS. 2–5, the camera 10 has a body 24 that holds a capture system 12 having an archival image capture unit 14 that uses photographic film 20*a* and an evaluation image capture unit 16 that captures images electronically. When the photographer trips a shutter release 26, a subject image (a light image of a scene) is captured as a latent image on a frame 28 of the film 20*a* and at least one electronic image is captured on an electronic array imager 30 of the evaluation image capture unit 16. The electronic image or images are digitally processed and used to provide one or more derived images that can be shown on an image display 32 mounted to the body 24.

The electronic images, as captured in analog form and after digitization, but not other modification, are referred to generically herein as "original electronic images". After further modification, the electronic images are referred to generically herein by the term "derived images". Derived images are modified relative to the original images. This can be for calibration to the display or a particular file structure, or matching to output media. These modifications may or may not also include the addition of metadata to the electronic image file. A derived image that is matched to the expected product of photofinishing the archival image is also referred to herein as a "verification image". More than one derived image can be made from a single original electronic image. A derived image that differs from the verification image in a predetermined manner, unrelated to expected photofinishing, is referred to herein as an "evaluation image". Modifications matched to expected photofinishing or other downstream use, may or may not also be present in an evaluation image.

A control system 34 that includes a controller 36 (also referred to herein as a microcomputer) and can also include a digital signal processor 38, controls other components of the camera 10 and performs processing related to the derived image.

The camera body 24 provides structural support and protection for the capture units 14,16 and other components. The body 24 of the camera 10 can be varied to meet requirements of a particular use and style considerations. It is convenient, if the body 24 has front and rear covers 40,42 joined together over a chassis 44. Many of the components of the camera 10 can be mounted to the chassis 44.

A film door 46 and a flip-up electronic flash unit 48 are pivotably joined to the covers 40,42 and chassis 44. The flash unit 48 is flipped up from partially covering the front cover 40 to uncover the taking lens 50, preparatory to using the camera 10. Flipping up the flash unit 48 closes a normally open main power switch 51 to electrically power on the camera 10. The type of main power switch 51 used and its manner of operation can be varied as desired. A power supply 53 accessed through the main power switch 51 is ordinarily one or more batteries.

The film image capture unit 14 has a film holder 52 that holds a film unit 18 during use. In the camera 10 of FIGS. 3–4, the film holder 52 is part of the chassis 44. The configuration of the film holder 52 is a function of the type of film unit 18 used and is not otherwise significant.

The film holder 52 includes a pair of film chambers 54,56 and a rearwardly opening exposure frame 58 between the film chambers 54,56. The film unit 18 has a canister **22*b* disposed in one of the chambers 54,56. A filmstrip 20*a* is wound around a spool 22*a* held by the canister 22*b*. During use, the filmstrip 20*a* extends across the exposure frame 58 and is wound into a film roll 60 in the other chamber 56. The exposure frame 58 has an opening 62 through which a light image exposes a frame 28** of the film at each picture taking event.

During use, the filmstrip **20*a* is moved by a film transport 64 out of the canister 22*b* of the film unit, is wound into a film roll 60 in the supply chamber 56, and is then returned to the canister 22*b*. The film transport 64, as illustrated, includes an electric motor 66 located within a film roll spool 68**, but other types of motorized transport mechanisms and manual transports can also be used. Filmstrip exposure can be on film advance or on rewind.

Figure 4:
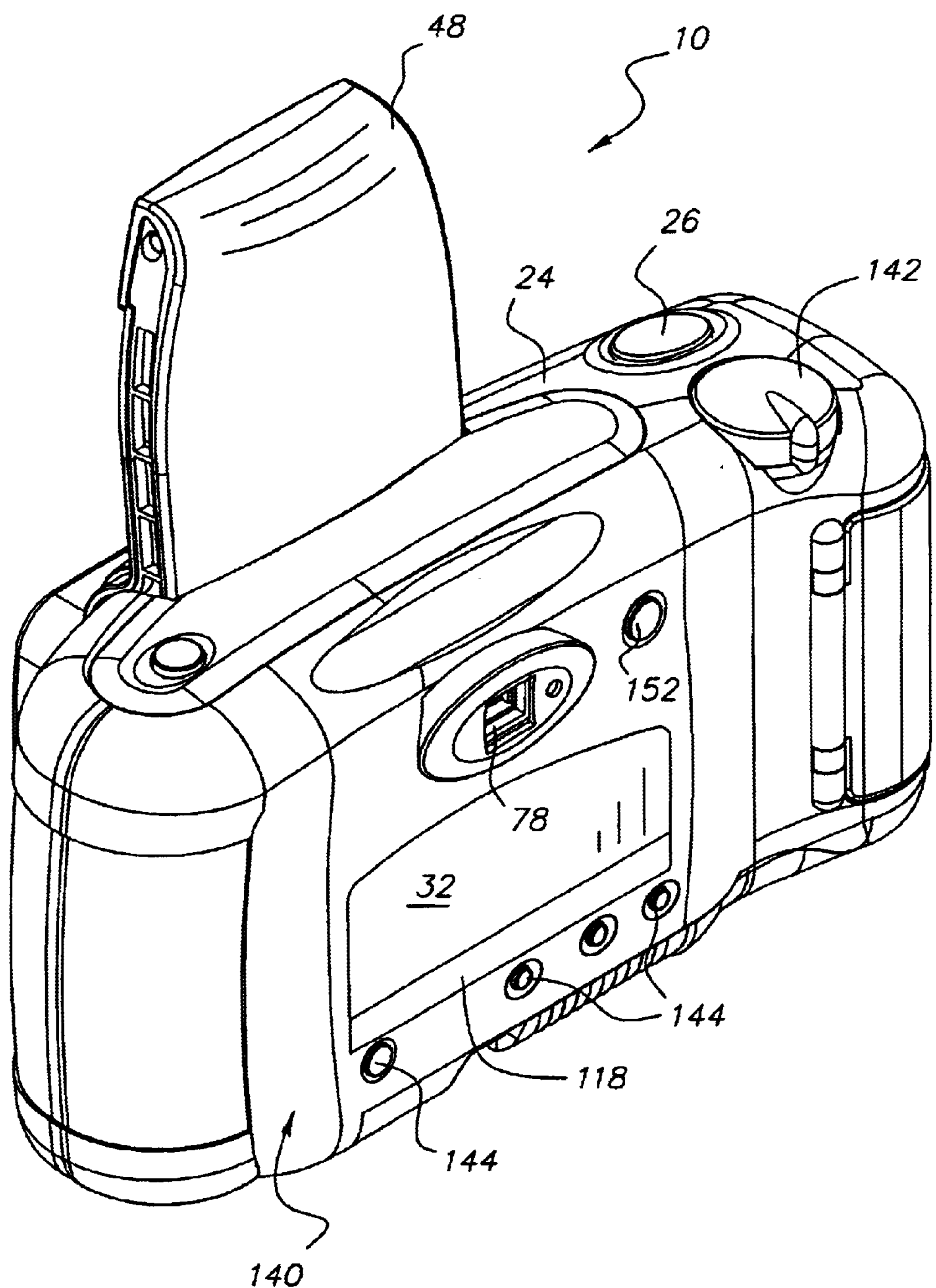
FIG. 4 is a perspective view of the camera of FIG. 2.
Figure 5:
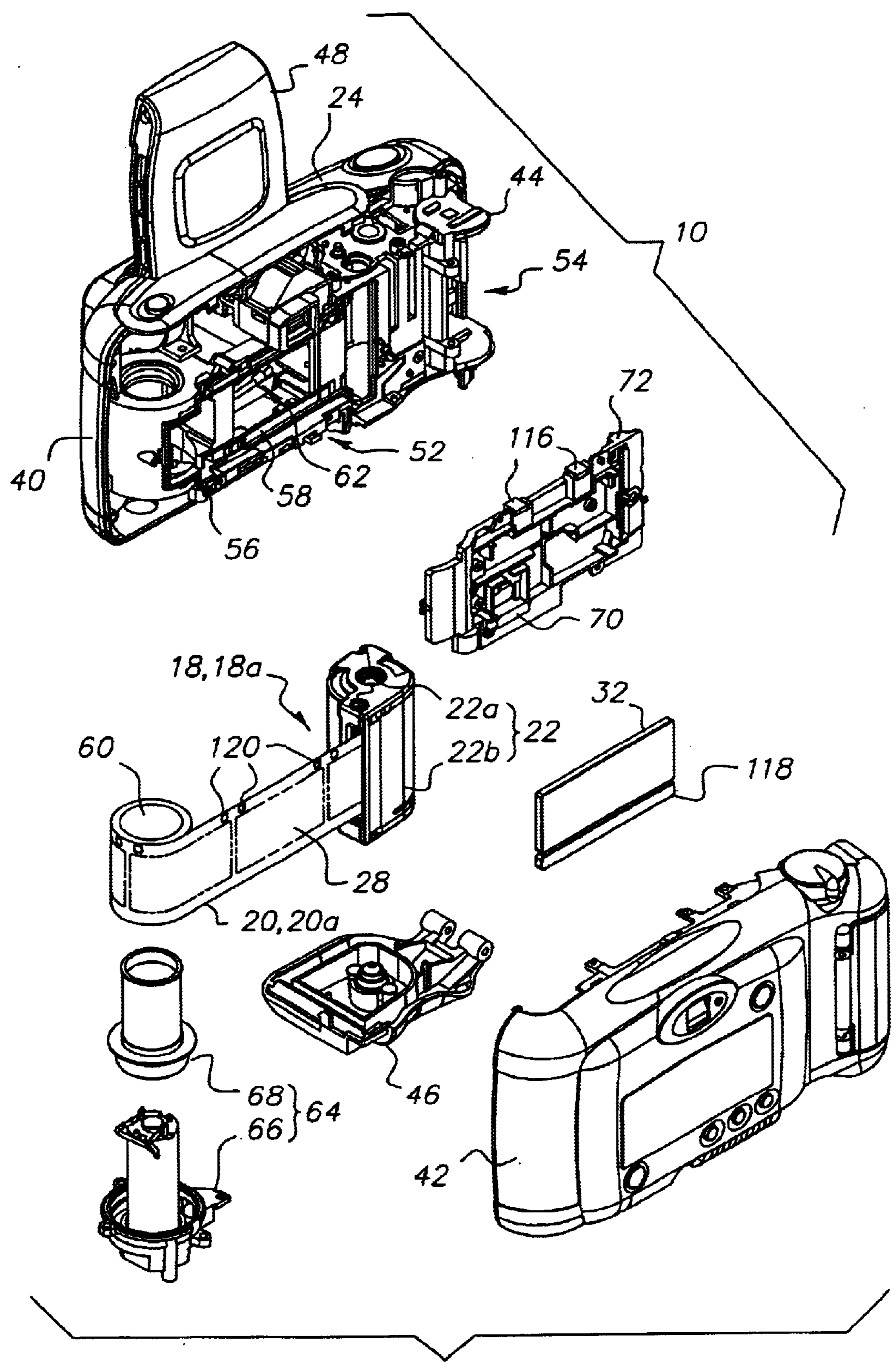
FIG. 5 is an exploded perspective view of the camera of FIG. 2.

The camera 10 shown in FIGS. 4–5 is reloadable and has motorized film transport. The camera 10 uses an Advanced Photo System ("APS") film cartridge. Other types of one or two chamber film cartridge could also be used and roll film can also be used. It is currently preferred that the camera 10 is reloadable. The camera 10 can have a IX-DX code reader 67 to determine the film type and number of film frames.

The APS filmstrip **20*a* has a transparent magnetic overlay (not illustrated) which gives it a magnetic recording capacity to store various metadata such as number of prints ordered and print aspect ratio, along a magnetic information track adjacent each exposed film frame 28. The filmstrip 20*a* is normally housed in an opaque film cartridge and is typically available in 15 exposure, 25-exposure, and 40-exposure lengths. Metadata, including user-selected information, can differ from frame-to-frame. The camera 10 has a data recorder 70 positioned adjoining the filmstrip 20*a* to record the metadata. FIGS. 4–5 illustrate an APS camera 10 with a data recorder 70 in the form of a magnetic head mounted within an opening in a film pressure platen 72 for magnetically recording the metadata along the magnetic information track adjacent each one of the exposed film frames 28, when the exposed film length is advanced out of the film cartridge. The film pressure platen 72 serves to support each film frame 28 flat for exposure at the exposure frame 58**.

The cameras 10 herein are not limited to APS film units nor to recording metadata on a magnetic layer. Optical recording of metadata by cameras is well known in the art, as are other means of storing such information such as use of memory media attached to a film canister. Information including the kinds of metadata provided by APS cameras and films, can be written, or read, or both by any means well known to those of skill in the art.

Frames 28 of the filmstrip **20*a* are temporarily positioned, one at a time, in the exposure frame 58, for archival image exposure. The film roll spool 68 is incrementally rotated following each film frame exposure, to wind the most-recently exposed one of the film frames 28 onto an exposed film roll 60 on the spool 68 and to position a fresh unexposed film frame 28 at the exposure frame 58. When the film roll spool 68 is incrementally rotated by the film transport 64, the filmstrip 20*a* is advanced forward one frame increment (which is slightly greater than a frame width) from the film cartridge. Film transport is controlled by the controller 36. When substantially the entire length of the filmstrip 20*a* is exposed, i.e. the total number of available frames 28 are exposed, a spindle (not shown) which projects into a cavity in a top end of a film spool 22*a* inside the film cartridge is continuously rotated by the film drive 64** using a suitable gear train (not shown) to rewind the exposed film length rearward into the film cartridge.

To magnetically record user-selected information as metadata on the filmstrip **20*a*, the magnetic track or tracks on the filmstrip 20*a* are moved past the data recorder 70 at an appropriate speed while a field is generated in a recording head (not shown) of the recorder 70. The recording can be done stepwise, moving the filmstrip 20*a* in increments for each film frame 28 or the data can be stored in memory in the camera 10 until all film exposures are completed, then all the data can be recorded in a single continuous pass. When all film exposures are completed and metadata has been recorded and the filmstrip 20*a* is light-tightly closed in the film canister 22*b*, the film unit 18 can be removed from the camera 10 by opening the film door 46**.

The electronic image capture unit 16 has an electronic array imager 30 driven by an imager driver 74. The electronic array imager 30 is configured so as to capture, for each picture-taking event, one or more electronic images that correspond to a latent image concurrently captured on the filmstrip **20*a*. The type of imager 30 used may vary, but it is highly preferred that the imager 30** be one of the several solid-state imagers available.

One highly popular type of solid-state imager commonly used is the charge coupled device ("CCD"). Of the several CCD types available, two allow easy electronic shuttering and thereby are preferable in this use. The first of these, the frame transfer CCD, allows charge generation due to photoactivity and then shifts all of the image charge into a light shielded, non-photosensitive area. This area is then clocked out to provide a sampled electronic image. The second type, the interline transfer CCD, also performs shuttering by shifting the charge, but shifts charge to an area above or below each image line so that there are as many storage areas as there are imaging lines. The storage lines are then shifted out in an appropriate manner. Each of these CCD imager has both advantages and disadvantages, but all will work in this application. A typical CCD has separate components that act as clock drivers, analog signal processor-analog/digital converter (also referred to as "A/D converter 114").

It is also possible to use an electronic image sensor manufactured with CMOS technology. This type of imager is attractive for use, since it is manufactured easily in a readily available solid-state process and lends itself to use with a single power supply. In addition, the process allows peripheral circuitry to be integrated onto the same semiconductor die. For example, a CMOS sensor can include clock drivers, the A/D converter 114, and other components integrated on a single IC. A third type of sensor which can be used is a charge injection device (CID). This sensor differs from the others mentioned in that the charge is not shifted out of the device to be read. Reading is accomplished by shifting charge within the pixel. This allows a nondestructive read of any pixel in the array. If the device is externally shuttered, the array can be read repeatedly without destroying the image. Shuttering can be accomplished by external shutter or, without an external shutter, by injecting the charge into the substrate for recombination.

The electronic image capture unit 16 captures a three-color image. It is highly preferred that a single imager be used along with a three-color or four color filter, however, multiple monochromatic imagers and filters can be used. Suitable three-color filters are well known to those of skill in the art, and are normally incorporated with the imager to provide an integral component. For convenience, the camera 10 is generally discussed herein in relation to embodiments having a single imager 30 with a three color filter (not separately illustrated). It will be understood that like considerations apply to cameras using more than three colors as well as cameras using multiple monochromatic imagers.

Figure 2:
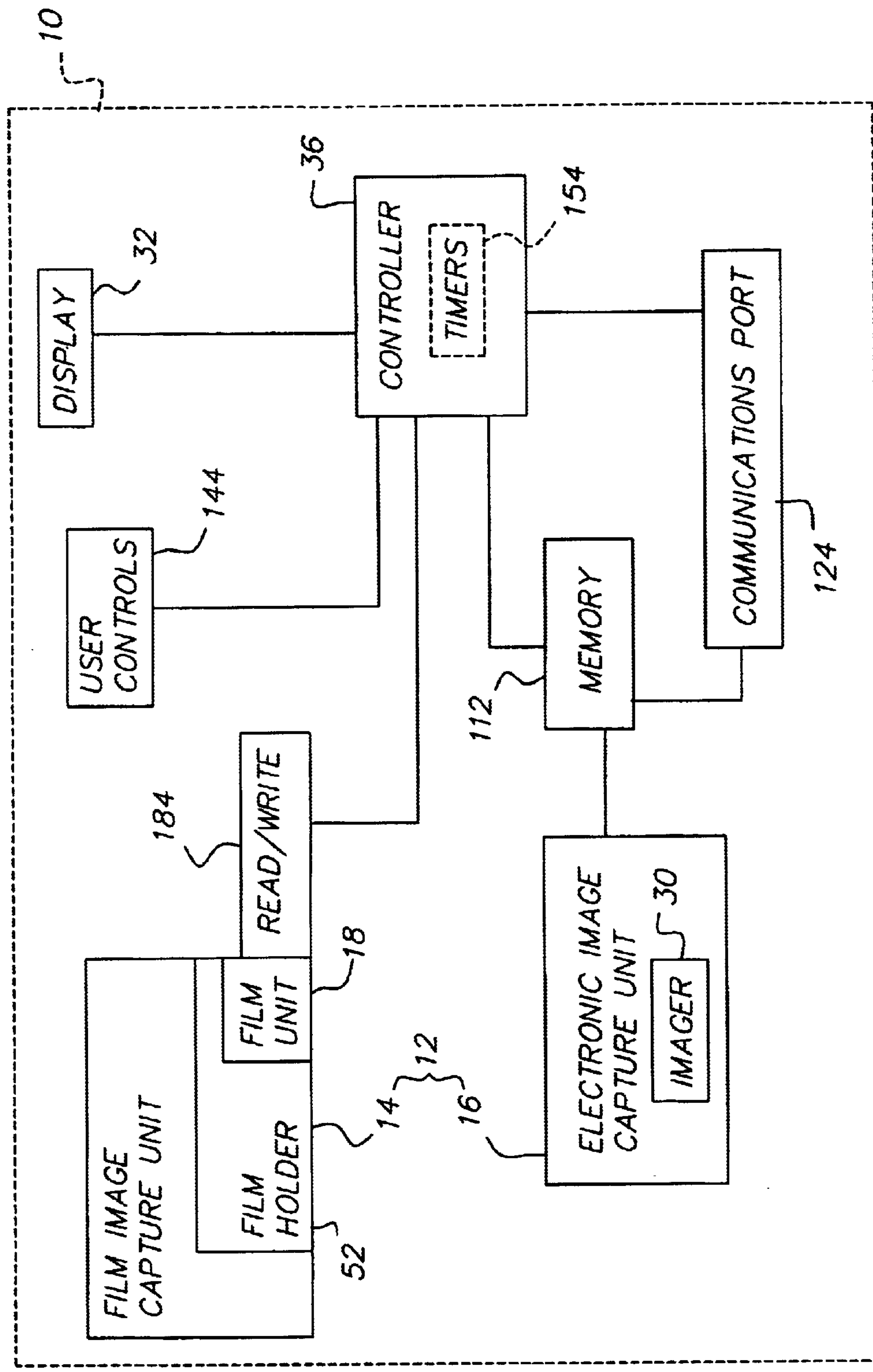
FIG. 2 is a simplified diagrammatical view of the camera.

Referring now primarily to FIG. 2, the camera 10 has a optical system 76 of one or more lenses mounted in the body 24. The optical system 76 is illustrated by a dashed line and several groups of lens elements. It will be understood that this is illustrative, not limiting. The optical system 76 directs light to the exposure frame 58 and to the electronic array imager 30. The optical system 76 also preferably directs light through an optical viewfinder 78 to the user.

The imager 30 is spaced from the exposure frame 58, thus, the optical system 76 directs light along a first path (indicated by a dotted line 80) to the exposure frame 58 and along a second path (indicated by a dotted line 82) to the electronic array imager 30. Both paths 80,82 converge at a position in front of the camera 10, at the plane of the subject image. In FIG. 2, the optical system 76 has a combined lens unit 84 that includes both an imager lens unit 86 and a viewfinder lens unit 88. The combined lens unit 84 has a partially transmissive mirror 90 that subdivides the second light path 82 between an imager subpath to the imager 30 and a viewfinder subpath that is redirected by a fully reflective mirror 92 and transmitted through an eyepiece to the photographer.

The optical system 76 can be varied. For example, the viewfinder lens unit 88, imager lens unit 86, and a taking lens unit 50 can be fully separate (not shown) or a combined lens unit 84 can include both a taking lens unit 50 and an imager lens unit 86 (not shown). Other alternative optical systems can also be provided.

In most cameras 10, there is a variation between the field of view of the viewfinder 78 and the field of view of the archival image capture unit 14. The scene delineated by the viewfinder 78 is typically 80 to 95 percent of the field of view of the archival image capture unit 14. The difference ensures that everything the photographer sees will be captured in the archival image, albeit with some additional image content at the edges. Cameras 10 are generally described and illustrated herein in terms of viewfinders that have a 100 percent match to the field of view of the archival image capture unit. This is a matter of convenience in describing the invention. The viewfinders 78 of the cameras 10 can be limited to 80 to 95 percent of the field of view of the archival image capture unit 14 without changing the other features described.

Referring again to the embodiment shown in FIG. 2, the taking lens unit 50 is a motorized zoom lens in which a mobile element or elements are driven, relative to a stationary element or elements, by a zoom driver 94. The combined lens unit 84 also has a mobile element or elements, driven, relative to a stationary element or elements, by a zoom driver 94. The different zoom drivers 94 are coupled so as to zoom together, either mechanically (not shown) or by a control system 34 signaling the zoom drivers 94 to move the zoom elements of the units over the same or comparable ranges of focal lengths at the same time.

The control system 34, which includes a controller 36, can take the form of an appropriately configured microcomputer, such as an embedded microprocessor having RAM or other memory for data manipulation and general program execution.

The taking lens unit 50 of the embodiment of FIG. 2 is also autofocusing. An autofocusing system has a rangefinder 96 that includes a sensor 98. The rangefinder 96 operates a focus driver 100, directly or through the control system 34, to move one or more focusable elements (not separately illustrated) of the taking lens unit 50. The rangefinder 96 can be passive or active or a combination of the two.

The taking lens unit 50 can be simple, such as having a single focal length and manual focusing or a fixed focus, but this is not preferred. One or both of the viewfinder lens unit 88 and imager lens unit 86 can have a fixed focal length or one or both can zoom between different focal lengths. Digital zooming (enlargement of a digital image equivalent to optical zooming) can also be used instead of or in combination with optical zooming for the imager 30. The imager 30 and image display 32 can be used as a viewfinder 78 prior to image capture in place of or in combination with the optical viewfinder 78, as is commonly done with digital still cameras 10. This approach is not currently preferred, since battery usage is greatly increased.

Although the camera 10 can be used in other manners, the archival image is intended to provide the basis of the photofinished or other final image desired by the user. The derived images thus do not have to have the same quality as the archival image. As a result, the imager 30 and the portion of the optical system 76 directing light to the imager 30 can be made smaller, simpler, and lighter. For example, the taking lens unit can be focusable and the imager lens unit 86 can have a fixed focus or can focus over a different range or between a smaller number of focus positions.

A film shutter 102 shutters 102,104 the light path to the exposure frame 58. An imager shutter 104 shutters 102,104 the light path to the imager 30. Diaphragms/aperture plates 106 can also be provided in both of the paths 80,82. Each of the shutters 102,104 is switchable between an open state and a closed state. The term "shutter" is used in a broad sense to refer to physical and/or logical elements that provide the function of allowing the passage of light along a light path to a filmstrip 20*a* or imager 30 for image capture and disallowing that passage at other times. "Shutter" is thus inclusive of, but not limited to, mechanical and electromechanical shutters of all types. "Shutter" is not inclusive of film transports and like mechanisms that simply move film or an imager 30 in and out of the light path. "Shutter" is inclusive of computer software and hardware features of electronic array imagers that allow an imaging operation to be started and stopped under control of the camera controller 36.

In currently preferred embodiments, the film shutter 102 is mechanical or electromechanical and the imager shutter 104 is mechanical or electronic. The imager shutter 104 is illustrated by dashed lines to indicate both the position of a mechanical imager shutter and the function of an electronic shutter. When using a CCD, electronic shuttering of the imager 30 can be provided by shifting the accumulated charge under a light shielded register provided at a non-photosensitive region. This may be a full frame as in a frame transfer device CCD or a horizontal line in an interline transfer device CCD. Suitable devices and procedures are well known to those of skill in the art. When using a CID, the charge on each pixel is injected into a substrate at the beginning of the exposure. At the end of the exposure, the charge in each pixel is read. The difficulty encountered here is that the first pixel read has less exposure time than the last pixel read. The amount of difference is the time required to read the entire array. This may or may not be significant depending upon the total exposure time and the maximum time needed to read the entire array.

CMOS imagers are commonly shuttered by a method called a rolling shutter. CMOS imagers using this method are not preferred, since this shutters each individual line to a common shutter time, but the exposure time for each line begins sequentially. This means that even with a short exposure time, moving objects will be distorted. Given horizontal motion, vertical features will image diagonally due to the temporal differences in the line-by-line exposure. Another method for shuttering CMOS imagers is described in U.S. Pat. No. 5,986,297. In this method, called single frame capture mode, all pixels are allowed to integrate charge during the exposure time. At the end of the exposure time, all pixels are simultaneously transferred to the floating diffusion of the device. At this point sequential read out by lines is possible.

An image display 32 is mounted on the outside of the body 24 and, preferably, faces the rear of the camera 10. The image display 32 is driven by an image display driver 108 and can be turned on to display a verification image to preview what a print or other final image is expected to look like. The image display 32 can be automatically turned off by a timer (not separately illustrated) for battery conservation. Signal lines 110 electronically connect the imager 30 through the control system 34 to the image display 32. The image display 32 produces a light image (also referred to here as a "display image") that is viewed by the user.

The control system 34, as earlier discussed, includes the controller 36 and memory 112 and also includes an analog-digital converter 114 (also referred to herein as a "A/D converter 114") (this term is inclusive of components that also include an analog signal processor and amplifier) and the image processor 38. Other components can also be provided, as discussed below, in detail. Suitable components for the control system 34 are known to those of skill in the art. Modifications of the control system 34 are practical, such as those described elsewhere herein. The controller 36 can be provided as a single component, such as a microcomputer or microprocessor, or as multiple components of equivalent function in distributed locations. The same considerations apply to the processor and other components. Likewise, components illustrated as separate units herein may be conveniently combined or shared in some embodiments.

The captured analog electronic image is amplified and converted by the A/D converter 114 to a digital electronic image, which is then processed in the image processor 38 and stored in the memory 112.

"Memory 112" refers to one or more suitably sized logical units of physical memory provided in semiconductor memory or magnetic memory, or the like. For example, the memory 112 can be an internal memory, such as a Flash EPROM memory, or alternately a removable memory, such as a CompactFlash card, or a combination of both. "Memory 112", as used herein, is separate from the "film unit 18". Thus, in some embodiments, the camera has both memory 112 and a digital film unit 18.

It is currently preferred that the signal lines 110 act as a data bus connecting the imager 30, controller 36, processor 38, the image display 32, and other electronic components.

The controller 36 and image processor 38 can be controlled by software stored in the same physical memory 112 that is used for image storage, but it is preferred that the processor 38 and controller 36 are controlled by firmware stored in dedicated memory (not separately illustrated), for example, in a ROM or EPROM firmware memory. Separate dedicated units of memory can also be provided to support other functions.

The respective electronic images correspond to the latent images on the exposed film frames 28, and, after processing, are individually stored in memory 112, each time the filmstrip **20*a* is advanced forward one frame increment following a film exposure. The memory 112 has a successive-image storage capacity for a limited number of electronic images. For convenience, the electronic images stored in a single camera 10** are generally treated herein as all being of the same size or about the same size. This is the case in currently preferred embodiments; but is not limiting.

The embodiment shown in the figures has space for storing up to 50 captured electronic images. This number is exceeds the maximum number of latent images on currently available APS film units, which is 40. When a latent image is exposed, the filmstrip **20*a* is advanced a frame increment. This is detected by one or more sensors 116 which signal the controller. In response, the controller 36 decrements a frame count (the number of film frames 28 available on the filmstrip 20*a* that remain to be exposed) stored in memory 112 by one. The frame count can go forward from zero or backward from 15, 25, or 40 depending on whether the filmstrip 20*a* has a 15-exposure, 25-exposure, or 40-exposure length. The current frame count is shown in an information display 118. In the camera shown in FIGS. 4–5, a pair of identical film perforation sensors 116 for sensing successive pairs of film perforations 120 in the filmstrip 20*a* are mounted in respective pockets in the film pressure platen 72** and are connected to the controller.

The manner in which electronic images are stored in memory 112 is not critical. For convenience, the storing of electronic images is discussed herein in terms of allocated separate single-image addresses or blocks "1" to "50" in the memory 112. Consistent with the frame count, respective frame numbers for the captured electronic images are stored at the single-image addresses "1" to "50" in the memory 112. The respective electronic images stored in the memory 112 at the single-image addresses can be accessed separately and shown individually on the image display 32.

The camera 10 has a communications port 124, through which the electronic images stored in memory 112 can be downloaded under the control of the controller 36 to a imaging device 126 (illustrated as a computer, and only in FIG. 1) such as a computer or network or digital appliance, using a communications protocol, such as the USB protocol. The camera 10 can optionally provide for downloading of individual electronic images; however, is currently preferred that all images in memory 112 be downloaded at each download event. The reason this approach is preferred, is that, in preferred embodiments, the size of the electronic images is relatively small and download times are relatively quick; and, with this in mind, it is better for the user to download all images, then discard any that are not desired, rather than present the risk that wanted images will not be downloaded or increase the time necessary to download images by increasing the number steps required.

The controller 36 facilitates the transfers of the image, along the signal lines 110, between the electronic components and provides other control functions, as necessary. The controller 36 includes a timing generation circuit (not separately illustrated) that produces control signals for all electronic components in timing relationship.

Calibration values for the individual camera 10 are stored in a calibration memory (not separately illustrated), such as an EEPROM, and supplied to the controller 36. The controller 36 operates the memory 112 or memories and the drivers including the zoom drivers 94, focus driver 130, imager driver 74, image display driver 108, aperture drivers 132, and film and imager shutter drivers 134,136. The controller 36 connects to a flash circuit 137 of the flash unit that mediates flash functions.

It will be understood that the circuits shown and described can be modified in a variety of ways well known to those of skill in the art. It will also be understood that the various features described here in terms of physical circuits can be alternatively provided as firmware or software functions or a combination of the two. The controller 36 is illustrated as a single component, but it will be understood that this is a matter of convenience in illustration. The controller 36 can be provided as multiple components of equivalent function in distributed locations. The same considerations apply to the processor 38 and other components. Likewise, components illustrated as separate units herein may be conveniently combined or shared in some embodiments.

The digital electronic image stored in memory 112, is accessed by the processor 38 and is modified so as to provide a required derived image. As a part of showing a derived image on the image display 32, the camera 10 may modify the derived image for calibration to the characteristics of the particular display. For example, a transform can be provided that modifies each image to accommodate the different capabilities in terms of gray scale, color gamut, and white point of the display and the imager and other components of the electronic capture unit. It is preferred that the display is selected so as to permit all of the verification image to be shown; however, more limited displays can be used. In the latter case, the displaying of the verification image includes calibration that cuts out part of the image, or contrast levels, or some other part of the information in the verification image.

The derived images can also be modified in the same manner that images are enhanced in fully digital cameras. For example, processing can provide interpolation and edge enhancement. A limitation here is that the derived images are intended to correspond to photofinished archival images and, thus, enhancements should limited so as to not render the derived image dissimilar to the corresponding photofinished archival image. If the archival image is an electronic image, then comparable enhancements can be provided for both verification and archival images. Digital processing of an electronic archival image can also include modifications related to file transfer, such as, JPEG compression, and file formatting.

Enhancements can be provided to match the calibrated derived image to output characteristics of a selected photofinishing channel. Photofinishing related adjustments assume foreknowledge of the photofinishing procedures that will be followed for a particular unit of capture media. This foreknowledge can be made available by limiting photofinishing options for a particular capture media unit or by standardizing all available photofinishing or by requiring the user to select a photofinishing choice, for example by entering a character on a control pad or setting a switch. This designation can then direct the usage of particular photofinishing options and can provide for a direct or indirect indication of the effect in a derived image. The application of a designation on a capture media unit could be provided by a number of means known to those in the art, such as application of a magnetic or optical code.

Derived images can be prepared from the electronic image before being needed or as needed, as desired, subject to the limitations of processing speed and available memory. To minimize the size of the memory 112, an electronic image can be processed and stored as a lower resolution image, before a succeeding image is read out from the imager 30.

Different types of image display 32 can be used. For example, the image display 32 can be a liquid crystal display ("LCD"), a cathode ray tube display, or an organic electroluminescent display ("OELD"; also referred to as an organic light emitting display, "OLED").

The image display 32 is preferably mounted on the back or top of the body 24, so as to be readily viewable by the photographer immediately following a picture taking. One or more information displays 118 can be provided on the body 24, to present camera information to the photographer, such as exposures remaining, battery state, printing format (such as C, H, or P), flash state, number of prints ordered, and the like. For convenience, the information display 118 is generally discussed here in the singular. The information display 118 and image display 32 can be provided by separate display devices or both be provided by contiguous parts of a common display device. The information display 118 can be deleted if information is instead provided on the image display 32 as a superimposition on the image or alternately instead of the image (not illustrated). If separate, the information display 118 is operated by an information display driver 138.

Figure 3:
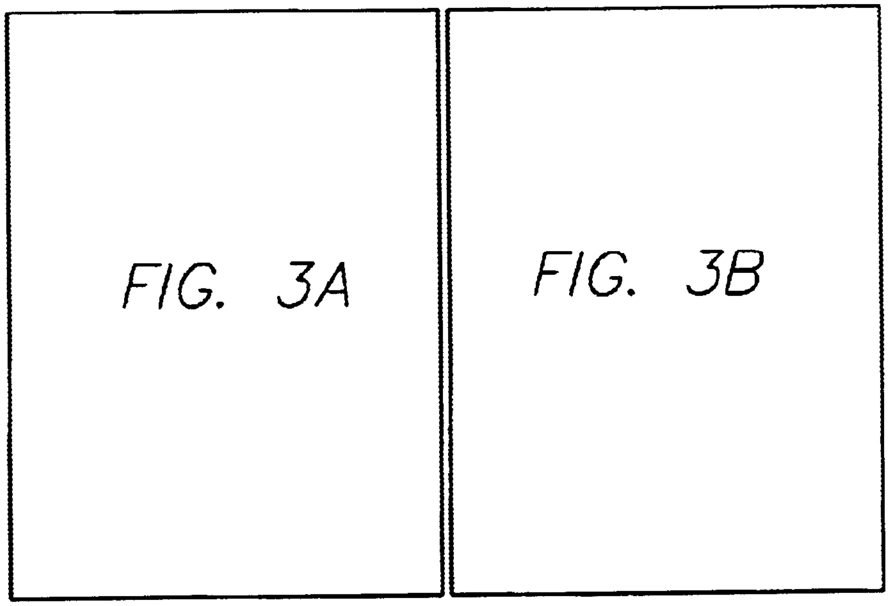
FIGS. 3–3B present a schematic diagram of an embodiment of the camera of FIG. 2.
Figure 3A:
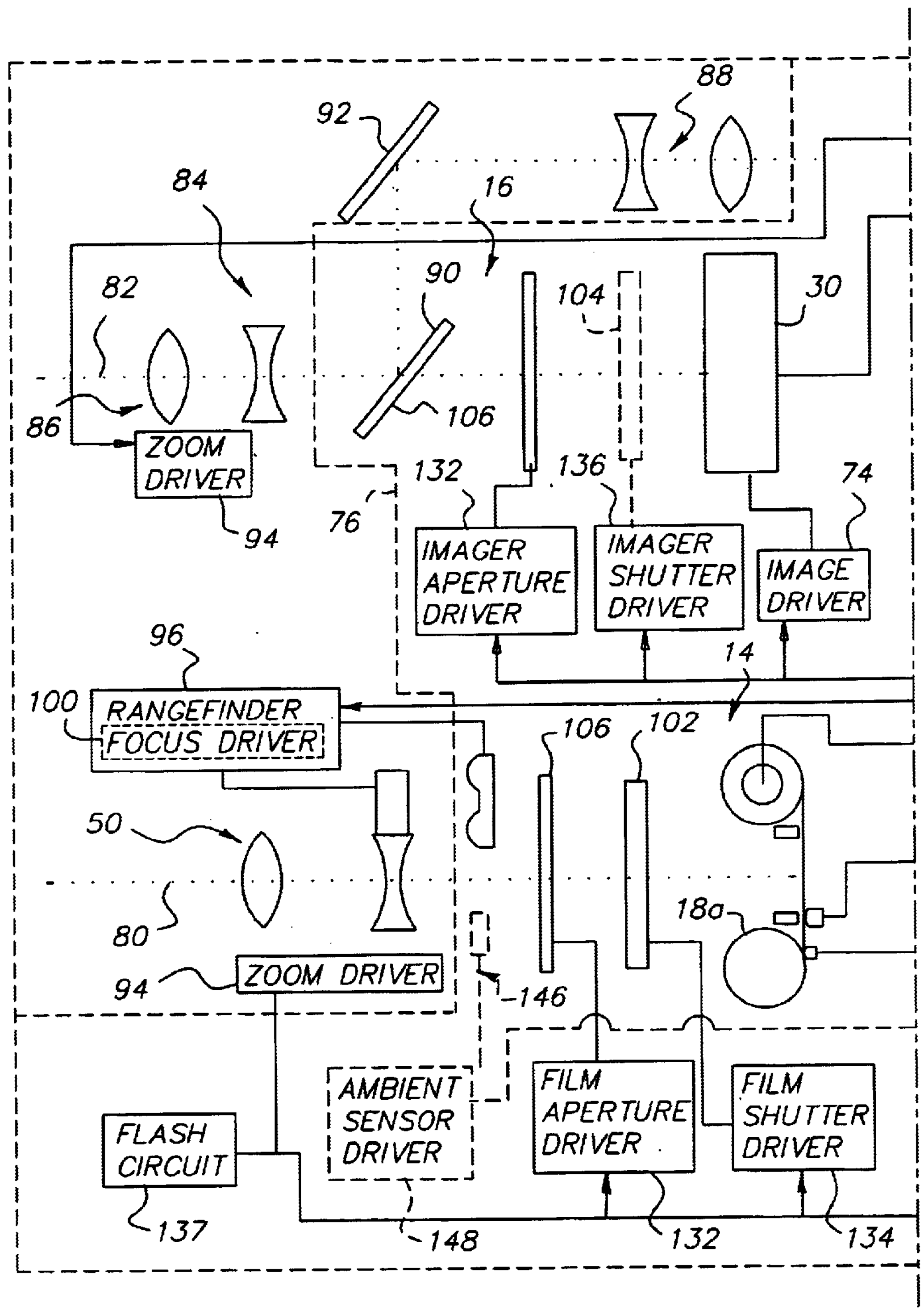
Figure 3B:
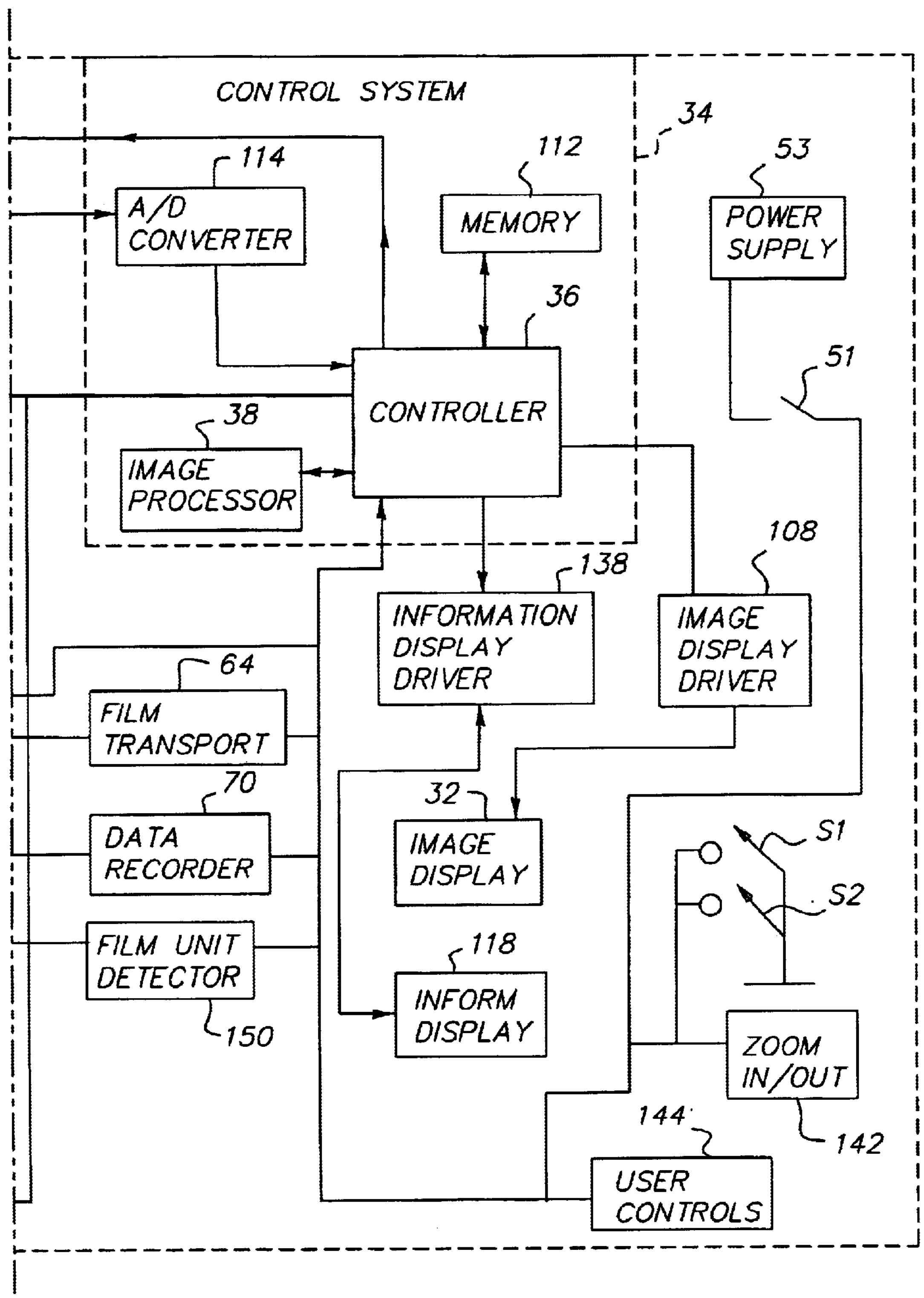

In the embodiment shown in FIGS. 3–4, the image display 32 is mounted to the back of the body 24 and the information display 118 is mounted to the body 24 adjacent to the image display 32 such that the two displays 32,118 form part of a single user interface 140 that can be viewed by the photographer in a single glance. The image display 32 and an information display 118 can be mounted instead or additionally so as to be viewable through the viewfinder 78 as a virtual display (not shown).

It is preferred that the image display 32 is operated on demand by actuation of a switch (not separately illustrated) and that the image display 32 is turned off by a timer 154 or by initial depression of the shutter release 26. Timers 154 can be provided as a function of the controller 36 and are discussed below in detail. When the image display 32 is actuated, earlier captured images can be reviewed using what is at other times, the zoom toggle 142, or other user control 144.

Referring now particularly to FIGS. 3–4, the user interface 140 of the camera 10 includes the shutter release 26, the "zoom in/out" toggle 142 that controls the zooming of the lens units, and other user controls 144 along with the image display 32 and the information display 118. The shutter release 26 operates both shutters 102,104. To take a picture, the shutter release 26 is actuated by the user and trips from a set state to an intermediate state, and then to a released state. The shutter release 26 is typically actuated by pushing, and, for convenience the shutter release 26 is generally described herein in relation to a shutter button that is initially depressed through a "first stroke", to actuate a first switch S1 and alter the shutter release 26 from the set state to the intermediate state and is further depressed through a "second stroke", to actuate a second switch S2 and alter the shutter release 26 from the intermediate state to the released state. Like other two stroke shutter releases well known in the art, the first stroke actuates exposure-delimiting camera components, such as autofocus, autoexposure, and flash unit readying; and the second stroke actuates capture of the archival image.

Referring now to FIG. 3, when the shutter release 26 is pressed to the first stroke, the taking lens unit 50 and combined lens unit 84 are each autofocused to a detected subject distance based on subject distance data sent by the rangefinder 96 to the controller 36. The controller 36 also receives data indicating what focal length the lens units 50,84 are set at from one or both of the zoom drivers or a zoom sensor (not shown). The camera 10 also detects the film speed of the film cartridge 18*a* loaded into the camera 10 using the reader 67 and relays this information to the controller 36. The camera 10 obtains scene brightness (Bv) from components, discussed below, that function as a light meter. The scene brightness and other exposure parameters are provided to an algorithm in the controller 36, which determines a focused distance, shutter speeds, apertures, and optionally a gain setting for amplification of the analog signal provided by the imager 30. Appropriate signals for these values are sent to the drivers via a motor driver interface (not shown) of the controller 36. The gain setting is sent to the A/D converter 114.

The camera 10 assesses ambient lighting using the imager 30 or a separate detector 146 (indicated by dashed lines in FIG. 3) or both. The detector 146 has an ambient detector driver 148 that operates a single sensor or multiple sensors (not shown). In some embodiments, the evaluation image capture unit 16 is used to assess ambient lighting. In those embodiments, one or more electronic images are captured prior to capture of the archival image. The captured electronic image data from one or more of these preliminary images is sampled and scene parameters, such as automatic setting of shutter speeds and diaphragm settings, are determined from that data. These preliminary electronic images can be captured in a continuing sequence as long as the capture system 12 is in a preliminary mode. For example, preliminary images can be captured, seratim, as long as the shutter release 26 is actuated through the first stroke and is maintained in that position. This capture of preliminary images ends when the shutter release 26 is returned to a stand-by position or is actuated through the second stroke for archival image capture. The preliminary electronic images could be saved to memory 112; but, except as otherwise described here, are ordinarily discarded, one after another, when the replacement electronic image is captured to reduce memory 112 usage. The preliminary images can also be provided to the image display 32 for use by the photographer, prior to picture taking, in composing the picture. This use of the image display 32 as an electronic viewfinder 78 greatly increases energy usage and is not preferred for that reason.

The electronic capture unit is calibrated during assembly, to provide measures of illumination, using known values. For example, the controller 36 can process the data presented in a preliminary image using the same kinds of light metering algorithms as are used for multiple spot light meters. The procedure is repeated for each succeeding preliminary image. Individual pixels or groups of pixels take the place of the individual sensors used in the multiple spot light meters. For example, the controller 36 can determine a peak illumination intensity for the image by comparing pixel to pixel until a maximum is found. Similarly, the controller 36 can determine an overall intensity that is an arithmetic average of all of the pixels of the image. Many of the metering algorithms provide an average or integrated value over only a selected area of the imager 30 array, such as an upper middle region. Another approach is to evaluate multiple areas and weigh the areas differently to provide an overall value. For example, in a center weighted system, center pixels are weighted more than peripheral pixels. The camera 10 can provide manual switching between different approaches, such as center weighted and spot metering. The camera 10 can alternatively, automatically choose a metering approach based on an evaluation of scene content. For example, an image having a broad horizontal bright area at the top can be interpreted as sky and given a particular weight relative to the remainder of the image.

Under moderate lighting conditions the imager 30 can provide light metering and color balance determination from a single preliminary image. More extreme lighting conditions can be accommodated by use of more than one member of the series of preliminary electronic images while varying exposure parameters until an acceptable electronic image has been captured. The manner in which the parameters are varied is not critical.

After the controller 36 receives the scene brightness value, the controller 36 compares scene brightness to a flash trip point. If the light level is lower than the flash trip point, then the controller 36 enables full illumination by the flash unit 48, unless the user manually turned the flash off. Appropriate algorithms and features for these approaches are well known to those of skill in the art.

A second switch S2 actuates when the shutter release 26 is further pushed to a second stroke. When the second switch S2 actuates, the film shutter 102 is tripped and the capture of the latent image exposure on the film frame 28 begins. The film shutter 102 momentarily opens for a duration referred to herein as a "archival image exposure time interval". The imager shutter 104 is also actuated and momentarily opens during the archival image exposure time interval to capture the initial electronic image.

When a film unit 18 is to be removed from the camera 10, the film door 46 is opened and the film unit 18 is extracted. The camera 10 has a film unit detector or signaler 150, which signals the controller 36 when a film unit 18 is present and the film door 46 has been closed. In response, the controller 36 can cause the information display 118 to show and icon or other indicia (not illustrated) that indicates whether or not a film unit 18 is loaded and the film door is shut.

The image display 32 can be used to verify the quality of a just captured image and can also be used to review earlier captured images. User controls 144 are provided for these functions. In the camera 10 shown in the figures, the last captured archival image is accessed by pressing a verify button 152. (What is shown is a verification image derived from the last captured image based on the requirements of the image display and other criteria such as expected photofinishing differences. For convenience, a distinction between an electronic image in memory and its derivative image suitable for display is not always made in discussions herein. It will be understood that such derivative images are prepared to meet display requirements and are not retained.)

The verify button 152 provides a signal to the controller, which activates the image display 32 and disables image capture while the image display 32 is actuated. The user can change from a the last captured image to earlier captured images by moving the zoom toggle 142. Some features of final images produced from the archival images can be modified while the verification images are viewed, as discussed below in detail.

In the embodiments in the figures, it is highly preferred that the camera memory 112 has sufficient capacity to store an electronic image corresponding to each of the film frames 28 of the film unit 18, since this allows the user to review all of the images of a film unit 18 at one time. Since the film units 18 come in different capacities, the memory 112 needs sufficient capacity to store an electronic image corresponding to each of the film frames 28 of a film unit 18 having the largest capacity. This provides excess capacity in memory 112 when smaller capacity film units 18 are used. It is preferred that the memory 112 of the camera 10 has sufficient capacity to provide some excess over even the largest capacity film unit 18.

The excess memory capacity can be used to allow the user to review electronic images corresponding to archival images of earlier used film units 18. The captured electronic images corresponding to the latent images in the film units 18 are not erased from memory 112 when the respective film unit 18 is removed from the camera 10; instead, once the memory 112 is full, the oldest captured electronic image is overwritten by the newest captured electronic image. (If necessary, two old electronic images may be deleted if required to free enough memory 112 to store one new image). The order in which the images are replaced, first in-first-out, corresponds to many practices in inventory control and the like and is also referred to herein by the term "FIFO".

Since the memory 112 is, preferably, large enough to hold electronic images from more than one roll of film, the memory 112 therefore holds two types of electronic images: current electronic images corresponding to the latent images on the exposed frames 28 of the film unit 18 currently loaded in the camera 10, and past electronic images corresponding to the latent images on the exposed frames 28 of one or more film units 18 earlier exposed in the camera 10. By storing both current images and past images, the user can always view or download a last series of electronic images, within the limits of storage capacity, even if a first film unit has been removed and a second film unit started.

While reviewing an electronic image, the user can edit one or more features of a final image that will be produced by photofinishing. This is done by changing one or more editing parameters that are recorded on the film units as digital information or metadata. With an APS film unit, the information recorded includes: an optional print title in English or other language; an optional print exposure correction (increase/decrease); a designation of a print format selected from "C" (classic), "H" (HDTV) and "P" (panoramic); and a print quantity numbers. A print having a "C" format is typically 4 (height)×6 (width) inches. A print having a "H" format is typically 4 (height)×7 (width) inches. A print having a "P" format is typically 4 (height)×10 (width) inches or 4 (height)×11.5 9 (width) inches. No matter which one(s) of the print formats is (are) selected, "C", and/or "H" and/or "P", the exposed frames 12 on the filmstrip 14 are always in the "H" format. As is known, this allows re-prints to be made in any of the three formats rather than just in the selected format.

Editing parameters in the form of digital metadata can be provided as part of the image file of an electronic archival image. The metadata is then used in photofinishing or production of other output using the image file. In another alternative embodiment, the archival image is electronic and is modified in accordance with the indicated parameters. As elsewhere indicated, discussion here is generally directed to embodiments in which archival images are captured on photographic film. Like considerations apply to other embodiments.

During use, editing parameters for every one of the exposed film frames of the film unit currently loaded in the camera are stored as recorded metadata on the film or as corresponding designations or assignments in the memory for the respective film frames. The same editing parameters can also be separately stored with the associated electronic images stored in the memory.

Figure 6:
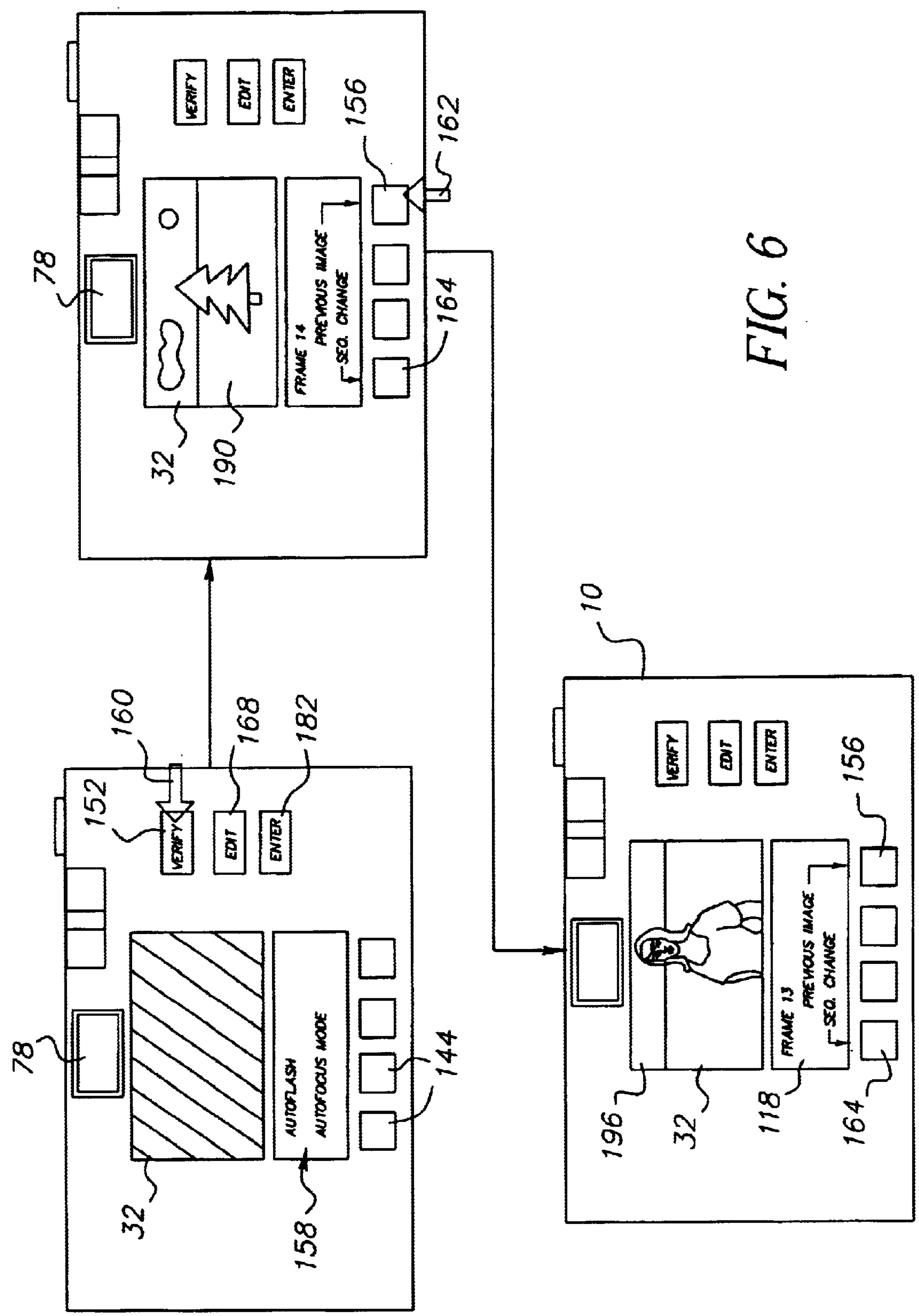
FIG. 6 is a diagrammatical view of the procedure of sequencing through images.
Figure 7:
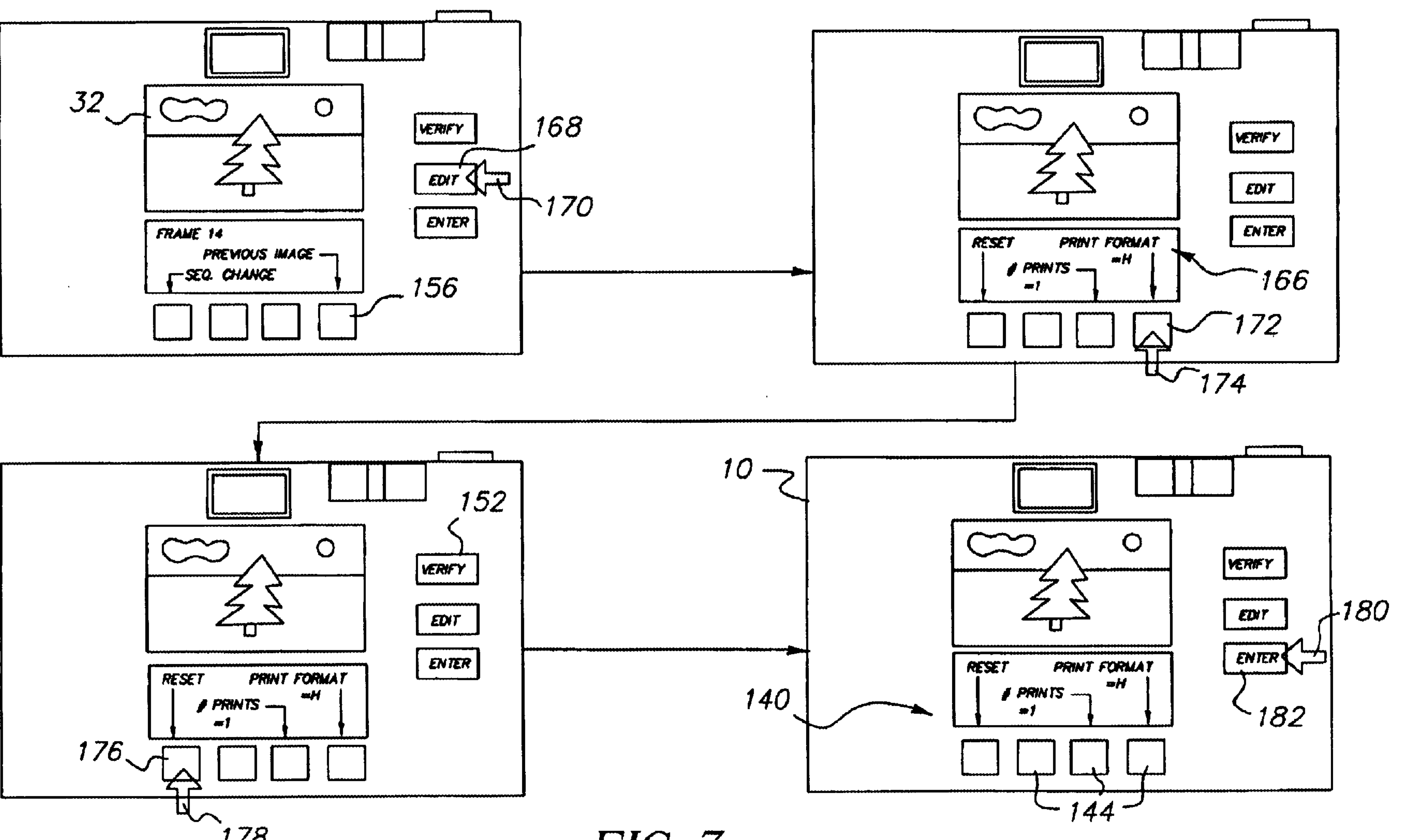
FIG. 7 is a diagrammatical view of the procedure of editing images.

Referring now to FIGS. 6–7, editing follows image capture and begins with the user pressing the verify button 152 of the user interface 140. The verify button 152 acts as a normally open switch connecting the image display 32 to the controller 36. Pressing the verify button 152 turns the image display 32 on when it is off and off when it is on. Responsive to activation, the controller 36 causes an image to be shown on the display 32. The specific image initially shown is discussed below in detail. An image selector 156 in the form of a dedicated user control or software designated user control (in the embodiment shown in FIGS. 1*a*–1*b* the zoom toggle), can then be actuated to sequence through the different electronic images stored in memory.

The images shown on the display 32 can sequence through automatically, in the form of a slide show, but this is not preferred for editing. What is preferred, is that a separate actuation of the image selector 156 be required to sequence from one electronic image to the next. FIG. 6 illustrates this procedure. The specific sequence followed is not critical and different sequences can be provided by different states of the image selector 156. This is shown for a particular embodiment of the camera in FIG. 6. The camera 10 is initially in an image capture state and the information display bears capture related information 158. The examples of this information, shown in FIG. 6, are operational modes for the capture system and flash and the number of the next film frame. The image display 32 is activated by the user pressing (indicated by arrow 160) the verify button 152 and an earlier image is selected by the user pressing (indicated by arrow 162) an image selector 156 (labeled "Previous image"). A sequence changer 164 is also included among the provided user controls.

It is currently preferred that the sequence in which the images are shown is chronological from newest to oldest. Other sequences such as discussed in U.S. Pat. No. 5,978,016 or such as oldest to newest can or ordering on the basis of editing parameters, can also be used. For example, the sequence can be in order of selected print formats and chronologically within each format. Electronic only images can be displayed in sequence with electronic images having corresponding latent images, or can be displayed in a separate sequence, as desired.

During editing, the display 32 indicates specific changes selected by the user and can also indicate values 166 for one or more of the various editing parameters. For example, numbers of prints and format can be indicated in alphanumeric form on the information display, as shown in FIG. 7. It is preferred, that as much as possible the image display present the selected changes as modifications of the displayed electronic image, such as the change to "P" print format shown in FIG. 7. Changes shown on the display, can be made on the stored electronic image in memory, but it is preferred that can be changes be made on a "cloned image", that is, a derived copy of the electronic image in memory. This provides better protection against user mistakes, since the user can back up to the image stored in memory without fear of irretrievable damage. In the embodiment shown in FIG. 7, to edit the Edit button 168 is pressed (indicated by arrow 170) and a change in format button 172 is then pressed (indicated by arrow 174). A reset button 176 is then pressed (indicated by arrow 178) to go back to the image as it existed before the editing session shown in FIG. 7.) This approach has addition advantages, since multiple cloned images can be generated and discarded as needed or before. This allows the user to rapidly switch back and forth between different editorial changes to more easily see the effects of those changes.

The camera can display images on the image display that include or are limited to indicia in the form of alphanumeric information or icons or the like for menus and other messages. For example, if the user pressed the verify button before capturing any images, the image display could present the words "No images" or an icon to that effect. For the purposes of discussion here, any presentation of pictorial or non-pictorial information, or a combination of the two on one or more displays, is considered a "displayed image".

When the user is satisfied with one or more editorial changes in the editing parameters, the user permanently records those changes in association with the respective archival images. In the embodiment shown in FIG. 7, the user presses (indicated by arrow 180) the Enter button 182. This causes film to be rewound and then moved past a magnetic read/write head 184 (shown in FIG. 2) as required to write changes in the metadata for respective film frames. Alternatively, the information is stored in memory, for later writing to the film in a similar manner, before the film unit is removed from the camera. A comparable procedure is followed for electronic archival images.

As earlier described, the controller 36 deactivates the image display 32 after a short period of inactivity. Activity can be variously defined for these purposes, as desired. For example, activity can be defined as actuation by the user of any user control 144 or actuation of any of a limited number of user controls or simply as initial display of the current electronic image. However it is defined, each activity restarts the timer 154 that measures a display deactivation time period. When the timer reaches the preset value, the image display 32 is deactivated. (Since the information display 118 typically consumes less energy than the image display, it is convenient to leave the information display activated but change to display of image capture related information.) The specific period of time selected is a function of the energy requirements of the camera and the available energy in the camera's battery or other power supply. This in turn it is a function of overall design characteristics of a particular camera such as size and weight. The display deactivation time period is generally treated herein as being constant, however, the display deactivation time period can vary, if desired. For example, a longer display deactivation time period can be provided with fresh batteries than with batteries that have a more limited charge.

As earlier discussed, the image display automatically deactivates while an image is being displayed. The displayed image at the time of deactivation may be one of the electronic images in memory or may be one of the cloned images earlier discussed, before or after editing, or may be indicia or a combination of one of the images and superimposed indicia. If the displayed image is one of electronic images in memory, it can be the last captured image or any of the earlier captured images.

Upon reactivation the image display shows one of two different categories of images: a default image or a user selected image. The default image is preferably the last captured image in memory, since that image is most relevant as a default image. The default image can be defined as some other image, if desired. The user selected image is a displayed image, other than the default image, shown at the time of deactivation. As above-noted, the user selected image can be any of a wide variety of different images; including an edited, but not saved, derived image. For convenience, the following discussion is primarily directed to a default image that is the last captured electronic image in memory and a user selected image that is one of the earlier captured electronic images in memory. It will be understood that the features described are not limited to such a default image and user selected image.

Figure 1B:
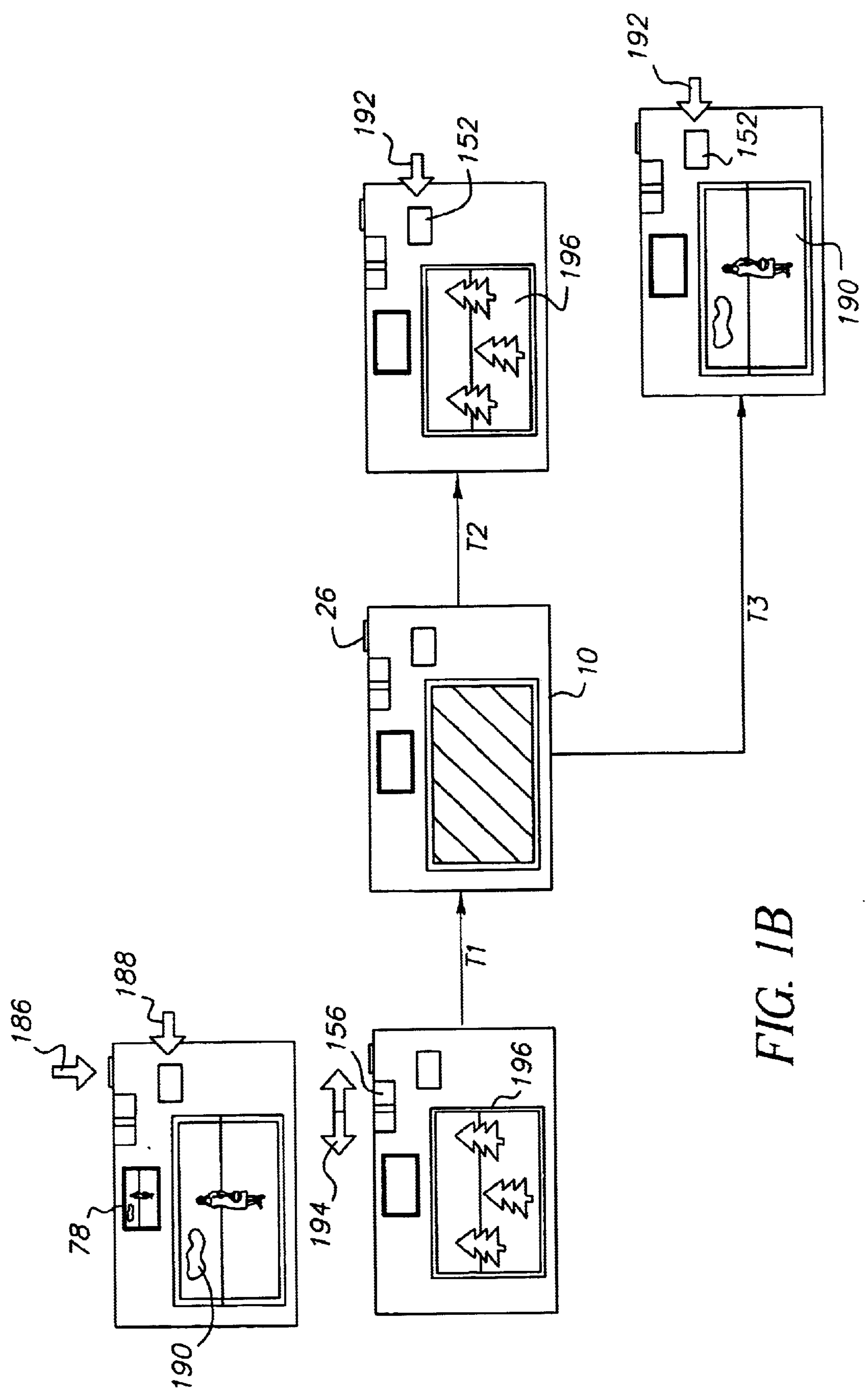

Referring now primarily to FIGS. 1*a*–1*b*, in the method, the image display 32 automatically deactivates while an electronic image is being displayed and then is reactivated by the user after a delay. In FIG. 1*a*, a user frames a subject image in the viewfinder 78, presses (indicated by arrow 186) a shutter release 26 and then presses (indicated by arrow 188) a verify button 152. The most recently captured electronic image 190 is shown on the display 32. A display deactivation time period (labeled "T1" in FIGS. 1*a*–1*b*) elapses and the image display is deactivated (indicated by cross-hatching in FIGS. 1*a*–1*b*). The last captured electronic image 190 was being shown on the image display 32 at the time of deactivation.

After a short or moderate delay (labeled "T2" in FIGS. 1*a*–1*b*) by the user, the image display 32 is reactivated by the user again pressing (indicated by arrow 192) the verify button, and the default image, the most recently captured image 190, is again shown. If, alternatively, the user delays for a longer time period (labeled "T3"in FIGS. 1*a*–1*b*) before reactivation, the result is the same. The last captured electronic image 190 is shown upon reactivation.

If the delay (not illustrated) is extensive, the controller will reach the time period for powering down all functions of the camera. If the camera is powered up afterward, and then the image display is again activated, the most recently captured image is again shown.

In FIG. 1*b*, the user has again captured and then displayed an image, but the user has then selected (indicated by double-headed arrow 194) an earlier captured electronic image 196 for viewing on the image display 32. The display deactivation time period T1 elapses and the image display is deactivated. The earlier captured electronic image 196 was being shown on the image display 32 at the time of deactivation.

After the short or moderate delay T2, the image display 32 is reactivated by the user, and the user selected image, the earlier captured image 190, is again shown. If, alternatively, the user delays for the longer time period T3 before reactivation, the default image, the last captured electronic image 190, is shown upon reactivation. The second time period, T3, is longer than the first, T2; but shorter than the time period for powering down the camera. Suitable times for T2 and T3 are a function of camera design in view of power consumption. In a particular embodiment, time periods of 15 seconds for T3 and less than 15 seconds for T2 are convenient.

When the image display is reactivated during the first time period and the user selected electronic image reappears, the user can return to an earlier activity, such as editing, or reviewing the displayed image, or sharing with others. The interrupting effect of the deactivation is banished from consideration very quickly, since the user does not have to think about doing more than pressing a single button.

The above discussion of reactivation is generally limited to effects on the image display. The information display can be activated and inactivated in the same manner, at the same time, if desired. Whether or not this is done, as above noted, it is preferred that the information shown on the information display be changed as appropriate for the displayed image and, when the image display is off, for a state indicating information relevant to the next image capture event.

The invention has been described in detail with particular reference to certain preferred embodiments thereof, but it will be understood that variations and modifications can be effected within the spirit and scope of the invention.

What is claimed is:

1. A method for capturing images and verifying captured images, said method comprising the steps of:

sequentially capturing a series of electronic images with a camera;

storing said electronic images in memory in said camera;

selectively activating an image display of said camera;

showing a default image on said display responsive to said activating;

selectively switching said display to a user selected image following said showing;

deactivating said display at the end of a display deactivation time period;

selectively reactivating said display following said deactivating;

showing said default image responsive to said reactivating, when said deactivating is prior to said switching;

showing said user selected image responsive to said reactivating, when said deactivating follows said switching and said reactivating is during a first time period following said deactivating; and showing said default image responsive to said reactivating, when said deactivating follows said switching and said reactivating is during a second time period following said first time period.

2. The method of claim 1 wherein said capturing defines a last captured image of said series and one or more earlier captured images, and said default image is said last captured image.

3. The method of claim 2 wherein said user selected image is one of said earlier captured images.

4. The method of claim 1 further comprising repeating said deactivating following said reactivating.

5. A method for capturing images and verifying captured images, said method comprising the steps of:

sequentially capturing a series of electronic images with a camera;

storing said electronic images in memory in said camera;

accepting a display command to activate a display of said camera;

activating said display responsive to said display command;

showing a default image on said display responsive to said activating;

accepting a change command to change said display to a user selected image;

showing said user selected image responsive to said change command;

deactivating said display at the end of a display deactivation time period;

following said deactivating, accepting a redisplay command to reactivate said display;

reactivating said display responsive to said redisplay command;

showing said user selected image responsive to said reactivating, when said deactivating follows said showing of said user selected image and said reactivating is during a first time period following said deactivating;

showing said default image responsive to reactivating:

when said deactivating is prior to said showing of said user selected image, and when said deactivating follows said showing of said user selected image and said reactivating occurs during a second time period following said first time period.

6. A method for capturing images and verifying captured images, said method comprising the steps of:

sequentially capturing a series of electronic images with a camera, said capturing defining a last captured image of said series and one or more earlier captured images;

storing said electronic images in memory in said camera;

selectively activating a display of said camera;

selectively showing a selected one of said earlier captured images on said display;

deactivating said display following at the end of a display deactivation time period;

selectively reactivating said display, following said deactivating;

following said reactivating, immediately displaying said selected one of said earlier captured images, when said reactivating is during an assignment image time period following said display deactivation time period, and immediately displaying said last captured image, when said reactivating is after said assignment image time period.

7. The method of claim 6 wherein said reactivating is during said assignment image time period and said method further comprises continuously maintaining said camera in an actuated state during said activating, showing, counting, deactivating, reactivating, and displaying steps.

8. The method of claim 6 further comprising, during said capturing of said electronic images, capturing a corresponding series of latent images on photographic film.

9. The method of claim 6 further comprising, after said activating and before said showing, immediately displaying said last captured image on said display.

10. The method of claim 6 further comprising restarting said counting responsive to a user input.

11. A method for capturing images and verifying captured images, said method comprising the steps of:

sequentially capturing a series of electronic images with a camera, said capturing defining a last captured image of said series and one or more earlier captured images;

storing said electronic images in memory in said camera;

selectively activating a display on said camera;

following said activating, immediately displaying said last captured image on said display;

following said displaying of said last captured image, selectively showing a selected one of said earlier captured images on said display;

counting a display deactivation time period;

deactivating said display following said display deactivation time period;

selectively reactivating said display, following said deactivating and during a assignment image time period following said display deactivation time period, following said reactivating, immediately displaying said selected one of said earlier captured images;

selectively reactivating said display a second time following said first reactivating and after said assignment image time period; and following said second reactivating, immediately displaying said last captured image.

12. The method of claim 11 further comprising, during said capturing of said electronic images, capturing a corresponding series of latent images on photographic film.

13. A camera comprising:

a body;

an electronic capture unit disposed in said body, said electronic capture unit capturing light images as a series of electronic images, said series having a last captured image and one or more earlier captured images;

memory disposed in said body, said memory being operatively connected to said electronic capture unit, said memory storing said electronic images;

a display activation switch operatively connected to said display, said switch being repeatedly user actuable to generate a plurality of activation switch signals;

a display mounted on said camera body, said display repeatedly activating responsive to said activation switch signals;

an image selector mounted on said camera body, said image selector being user actuable in a selected one of a plurality of states to send an ready image signal designating one of said electronic images in said memory;

a controller operatively connected to said memory, said display, said display activation switch, and said image selector, said controller having a timer, said timer repeatedly counting down an assignment image time period following each said ready image signal, said controller directing transmission of a ready image from said memory to said display responsive to each of said activation switch signals, said ready image being the respective electronic image designated by said ready image signal following said ready image signal and until expiration of said assignment image time period, said ready image being said last captured image in the absence of said ready image signal and after expiration of said assignment image time period.

14. The camera of claim 13 wherein said timer counts down at least one display deactivation time period during each of said assignment image time period, and said controller deactivates said display at the expiration of each of said display deactivation time periods.

15. The camera of claim 14 wherein said timer is capable of restarting said time periods.

16. The camera of claim 14 wherein said timer restarts said time periods responsive to each of said activation switch signals.

17. The camera of claim 14 wherein said timer restarts said timer periods responsive to a repeat of said ready image signal in a user selected one of said plurality of states.

18. The camera of claim 14 wherein said timer restarts said time periods responsive to a user actuation of one of said display activation switch and said image selector.

19. The camera of claim 13 further comprising a film capture unit selectively capturing latent images on the film, said latent images corresponding to respective said electronic images.

20. A camera comprising:

a body;

an electronic capture unit disposed in said body, said electronic capture unit capturing light images as a series of electronic images, said series having a last captured image and one or more earlier captured images;

memory disposed in said body, said memory being operatively connected to said electronic capture unit, said memory storing said electronic images;

a display activation switch operatively connected to said display, said switch being repeatedly user actuable to generate a plurality of activation switch signals;

a display mounted on said camera body, said display repeatedly activating responsive to said activation switch signals;

an image selector mounted on said camera body, said image selector being user actuable in a selected one of a plurality of states to send an ready image signal designating one of said electronic images in said memory;

a controller operatively connected to said memory, said display, said display activation switch, and said image selector, said controller having a timer, said timer repeatedly counting down a predetermined first time period following each said activating, said controller deactivating said display at the expiration of each of said first time periods, said controller directing transmission of a ready electronic image from said memory to said display responsive to each of said activation switch signals, said ready electronic image being the respective electronic image designated by said ready image signal, following said ready image signal and until expiration of both said first time period and a assignment image time period following said first time period, said ready electronic image being said last captured image in the absence of said ready image signal and after expiration of said second time period.

21. The camera of claim 20 wherein said timer restarts said time periods responsive to a user actuation of one of said display activation switch and said image selector.

22. The camera of claim 20 further comprising a film capture unit selectively capturing latent images on the film, said latent images corresponding to respective said electronic images.

23. A camera comprising:

a body;

an electronic capture unit disposed in said body, said electronic capture unit capturing light images as a series of electronic images, said series having a last captured image and one or more earlier captured images;

memory disposed in said body, said memory being operatively connected to said electronic capture unit, said memory storing said electronic images;

a display mounted on said camera body, a display activation switch operatively connected to said display, said switch being repeatedly user actuable to generate a plurality of activation switch signals;

an image selector mounted on said camera body, said image selector being user actuable in a selected one of a plurality of states to send an ready image signal designating one of said electronic images in said memory;

a controller operatively connected to said memory, said display, said display activation switch, and said image selector, said controller repeatedly activating said display responsive to said activation switch signals, said controller, following each said activating, initiating counting down a predetermined first time period, said controller deactivating said display at the expiration of said first time period, said controller transmitting a ready electronic image from said memory to said display responsive to each of said activation switch signals, said ready electronic image being the respective electronic image designated by said ready image signal, following said ready image signal and until expiration of both said first time period and a assignment image time period following said first time period, said ready electronic image being said last captured image in the absence of said ready image signal and after expiration of said second time period.

* * * * *